(12) United States Patent
Reisch et al.

(10) Patent No.: US 12,025,211 B2
(45) Date of Patent: Jul. 2, 2024

(54) TRANSMISSION FOR A VEHICLE AND POWERTRAIN WITH SUCH A TRANSMISSION

(71) Applicant: ZF Friedrichshafen AG, Friedrichshafen (DE)

(72) Inventors: Matthias Reisch, Ravensburg (DE); Ulrich Kehr, Tettnang (DE); Michael Kozok, Dörzbach (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/050,571

(22) Filed: Oct. 28, 2022

(65) Prior Publication Data
US 2023/0135813 A1    May 4, 2023

(30) Foreign Application Priority Data
Oct. 29, 2021 (DE) .......................... 102021212217.5

(51) Int. Cl.
*F16H 48/10* (2012.01)
*F16H 48/38* (2012.01)

(52) U.S. Cl.
CPC ............. *F16H 48/10* (2013.01); *F16H 48/38* (2013.01)

(58) Field of Classification Search
CPC ..... F16H 48/10; B60K 1/00; B60K 2001/001; B60K 17/346; B60K 17/3462
See application file for complete search history.

(56) References Cited

U.S. PATENT DOCUMENTS

| | | | | |
|---|---|---|---|---|
| 1,341,223 A | * | 5/1920 | Thomas | B60K 17/346 475/221 |
| 5,146,801 A | * | 9/1992 | Oda | B60K 17/346 475/221 |
| 5,845,732 A | * | 12/1998 | Taniguchi | B60K 17/16 180/65.6 |

(Continued)

FOREIGN PATENT DOCUMENTS

| | | | | |
|---|---|---|---|---|
| CN | 103547836 A | * | 1/2014 | ............... B60K 1/00 |
| DE | 4305252 C2 | * | 2/1999 | ............. B60K 17/08 |

(Continued)

OTHER PUBLICATIONS

Office Action dated May 27, 2022 for German Patent Appliction No. 10 2021 212 217.5 (12 pp.), note: pp. 1 and 2 are English language Explanations to Section C. Result of Determination Document.

*Primary Examiner* — Sherry L Estremsky
(74) *Attorney, Agent, or Firm* — Crowell & Moring LLP (57) ABSTRACT

A transmission may have an input shaft, a first output shaft, a second output shaft, and an integral differential functionally located between the input shaft and the two output shafts. The transmission may have a planetary gearset that has one or more gearset elements, and a spur gearset, which has a first spur gear and second spur gear that are intermeshed, where a first gearset element is connected to the input shaft for conjoint rotation, where a second gearset element is connected to the first output shaft for conjoint rotation, where a third gearset element is at least indirectly connected to first spur gear for conjoint rotation, and where the second spur gear is at least indirectly connected to the second output shaft for conjoint rotation.

20 Claims, 6 Drawing Sheets

(56) References Cited

U.S. PATENT DOCUMENTS

| | | | | |
|---|---|---|---|---|
| 6,705,966 | B2* | 3/2004 | Schroder | B60K 17/3462 |
| | | | | 475/233 |
| 9,669,710 | B2* | 6/2017 | Meixner | B60K 17/35 |
| 9,856,960 | B2* | 1/2018 | Isono | F16H 48/34 |
| 10,132,395 | B2* | 11/2018 | Kurth | B60K 1/00 |
| 10,344,829 | B2* | 7/2019 | Knoblauch | B60K 1/02 |
| 10,982,745 | B2* | 4/2021 | Holmes | B60K 1/00 |

FOREIGN PATENT DOCUMENTS

| | | | | |
|---|---|---|---|---|
| DE | 102011100815 A1 * | 11/2012 | | B60K 17/3462 |
| DE | 102013210312 A1 * | 12/2014 | | F16H 3/54 |
| DE | 10 2013 218 502 A1 | 3/2015 | | |
| DE | 102013218502 A1 * | 3/2015 | | B60K 17/346 |
| DE | 10 2014 225 139 A1 | 6/2016 | | |
| DE | 102018208044 A1 * | 11/2019 | | B60K 1/00 |
| DE | 102020200123 A1 * | 7/2021 | | |
| EP | 1445143 A1 * | 8/2004 | | B60K 17/3462 |

\* cited by examiner

TRANSMISSION FOR A VEHICLE AND POWERTRAIN WITH SUCH A TRANSMISSION

RELATED APPLICATION

This application claims the benefit of, and priority to, German Patent Application DE 10 2021 212 217.5, filed Oct. 29, 2021, which is hereby incorporated by reference herein in its entirety.

TECHNICAL FIELD

The invention relates to a transmission for a powertrain in a vehicle, a powertrain with such a transmission, and a vehicle with such a powertrain.

BACKGROUND

A transmission is described in DE 10 2019 205 750 A1 that comprises an input shaft, a first output shaft, a second output shaft, a first planetary gearset, and a second planetary gearset connected to the first planetary gearset. The planetary gearsets each comprise numerous elements, and the input shaft, two output shafts, planetary gearsets and their elements are arranged and designed such that a torque introduced via the input shaft is converted and distributed at a defined ratio to the two output shafts. Furthermore, the torques are never combined. At least one element in the first planetary gearset is connected to an element in the second planetary gearset for conjoint rotation, and another element in the second planetary gearset is secured to a nonrotating component.

In view of this background, an object of the present disclosure is to describe a space-saving transmission for a powertrain in a vehicle.

BRIEF DESCRIPTION OF THE DRAWINGS

Exemplary embodiments of the invention shall be explained in greater detail below in reference to the schematic drawings, in which identical or similar elements are provided with the same reference symbols. Therein.

DETAILED DESCRIPTION

In view of the background above, certain aspects are presented that relate to a space-saving transmission for a powertrain in a vehicle.

In one general aspect, a transmission for a powertrain in a vehicle contains an input shaft, a first output shaft, a second output shaft, and an integral differential functioning between the input shaft and two output shafts, in which the differential comprises a planetary gearset with numerous gearset elements and a spur gearset with two intermeshing spur gears, where a first gearset element is connected to the input shaft for conjoint rotation, a second gearset element is connected to the first output shaft for conjoint rotation, and a third gearset element is connected at least indirectly to the first spur gear for conjoint rotation, and the second spur gear is connected at least indirectly to the second output shaft for conjoint rotation, and a first output torque can be transferred to the first output shaft by means of the planetary gearset, and a bracing torque in the planetary gearset can converted in the spur gearset such that a second output torque that corresponds to the first output torque can be transferred to the second output shaft.

According to a particular implementation, the first spur gear is supported at least indirectly on a stationary component by means of a first bearing element and the second spur gear is supported at least indirectly on the stationary component by means of a second bearing element, and at least one of the bearing elements is located at least partially within the respective spur gear.

In other words, the two gearwheel torques are not combined to form a single axle torque in a component. Instead, the drive power to the input shaft is divided in the integral differential and applied to the two output shafts in accordance with the design of the planetary gearset and the spur gearset. As a result, the components in the integral differential can be lighter due to the respective, relatively low torques they have to accommodate. This also results in smaller components and a weight reduction. Moreover, a transmission is obtained in which the integral differential both converts and distributes the torque, which previously required two separate assemblies instead of this single, integral assembly. The invention therefore comprises a combined transmission and differential, which converts as well as distributes torque to the output shafts.

By locating the bearing element(s) at least partially, preferably entirely, within the respective spur gears, the space required for the transmission, in particular the bearings for the spur gears, is minimized, using a comparatively simple construction. The transmission is designed such that at least one of the bearing elements is located at least partially radially inside at least one of the two spur gears.

An integral differential is understood to be a differential that has both a planetary gearset and a spur gearset in the framework of this invention, where the planetary gearset is functionally connected to the input shaft, spur gearset, and first output shaft. The spur gearset is functionally connected to the second output shaft. The input torque to the input shaft can be converted with this integral differential and distributed or transferred to the two output shafts at a defined ratio. Preferably 50% of the input torque is transferred to each of the output shafts, such that it is equally divided between these output shafts. As a result, none of the components are subjected to both output torques. In other words, the output torques are never combined. Furthermore, the differential has no gears that rotate in a block, or without a rolling motion, when the output rotational rates are identical. Furthermore, the intermeshed components of the differential always rotate in relation to one another, independently of the output rotational rates of the output shafts. The output shafts in the transmission are designed in particular to be functionally connected to wheels on the motor vehicle. The respective output shafts can be connected directly or indirectly to their associated wheels.

The planetary gearset is part of a planetary transmission integrated in the differential, comprising a sun gear, ring gear, and numerous planet gears on a circular track surrounding the sun gear. The planetary gearset advantageously has exactly one stationary gear ratio.

In theory, the planetary gearset and the spur gearset can be arranged arbitrarily in the differential and functionally connected to one another to obtain a desired gear ratio. According to one exemplary embodiment, the first gearset element in the planetary gearset is a sun gear, the second is a planet carrier, and the third is a ring gear. The input shaft is therefore connected to the sun gear for conjoint rotation, and the first output shaft is connected to the planet carrier for conjoint rotation, while the first spur gear is connected to the ring gear for conjoint rotation. According to another exemplary embodiment, the first gearset element in the planetary gearset is the sun gear, the second is the ring gear, and the third is the planet carrier. In this case, the input shaft is connected to the sun gear for conjoint rotation, while the first output shaft is connected to the ring gear for conjoint rotation and the first spur gear is connected to the planet carrier for conjoint rotation. It is also conceivable that the first gearset element is the planet carrier, the second is the ring gear, and the third is the sun gear. Other combinations are also readily conceivable.

Other components can be placed between the aforementioned components of the integral differential, e.g. intermediate and coupling shafts. According to one exemplary embodiment, the third gearset element in the planetary gearing is connected to the first spur gear via an intermediate shaft for conjoint rotation. A first gearset element of the planetary gearset is also connected to the first spur gear via a coupling shaft for conjoint rotation. In particular, the ring gear in the planetary gearset is connected to the first spur gear for conjoint rotation. This connection between the first spur gear and the intermediate shaft is preferably obtained by means of gear teeth on the first spur gear and the intermediate shaft. The first spur gear can also be welded and/or bolted to the intermediate shaft. The first spur gear and the intermediate shaft can also be formed as an integral unit.

The input shaft is preferably designed to be connected to a drive shaft in a drive unit for conjoint rotation. The drive unit generates a drive power that is transferred to the input shaft via the drive shaft. The drive shaft in the drive unit can be connected to the input shaft for conjoint rotation. The drive shaft and input shaft can also be designed as a single, coherent component.

The input shaft is preferably a solid shaft. This means that the input shaft can have a smaller outer diameter, such that the input shaft, or rotor shaft, can be supported on smaller rotor bearings, which also allows for size reductions.

The input shaft can also be hollow. In this case, the first output shaft can fit axially inside the input shaft. One of the output shafts preferably passes through the transmission, and potentially through the drive unit in the powertrain. This results in a so-called "inline" structure through the transmission, for transferring drive power from the differential to the wheel functionally connected thereto.

A "shaft" is a rotating component in the transmission with which various components in the transmission are connected to one another for conjoint rotation, or via which such a connection is obtained when a corresponding shifting element is actuated. The respective shaft can connect the components radially or axially, or even radially and axially, to one another. A shaft does not have to be a cylindrical, rotating machine element for transferring torques, and instead it can be any connecting element that connects individual components or elements to one another, in particular a connecting element that connects numerous elements to one another for conjoint rotation.

If two components in the transmission are "connected or coupled for conjoint rotation," this means, as set forth in the invention, that there is a permanent connection between the elements, such that they cannot rotate independently of one another. In particular, there are no shifting elements between these components, which can be elements in the differential, and/or shafts, and/or a nonrotating component in the transmission, but instead, these components are permanently coupled to one another. An elastically rotating connection between two components can also be understood to be permanent, or such that the elements rotate conjointly. In particular, a conjoint rotation connection can also contain joints, e.g. for enabling a steering movement or wheel suspension.

The planetary gearset and the spur gearset are preferably axially adjacent to one another. In other words, the gearset elements in the planetary gearing are in a first plane, and the gearwheels in the spur gearset are located in a second plane, and the two planes are substantially parallel, and axially adjacent to one another. The respective planes are substantially perpendicular to the respective axes in the vehicle.

Alternatively, the planetary gearset and the spur gearset are placed radially above one another. In other words, the gearset elements in the planetary gearset and the gearwheels in the spur gearset are located in the same axial plane. In this case, the planetary gearset and the spur gearset are also located in a common wheel plane, potentially resulting in a shorter transmission, which is therefore particularly compact.

The planetary gearset is preferably a planetary gearset with a negative ratio. This negative planetary gearset forms a planetary gearset with a planet carrier on which a first planet gear rotates, a sun gear and a ring gear, in which the gear teeth of at least one of the planet gears mesh with both the gear teeth on the sun gear and on the ring gear, such that the sun gear and ring gear rotate in opposite directions when the sun gear rotates and the carrier remains stationary. The planetary gearset can also have a positive ratio. A positive planetary gearset differs from a negative planetary gearset in that the positive planetary gearset has first and second, or inner and outer, planet gears, which can rotate on the planet carriers. The gear teeth on the first, or inner, planet gears mesh with the gear teeth on the sun gear and on the second, or outer, planet gears. The gear teeth on the outer planet gears also mesh with the gear teeth on the ring gear. This means that when the planet carrier remains stationary, the ring gear and sun gear rotate in the same direction. It is also conceivable for the planetary gearset to have numerous planet gears of different sizes that rotate on a planet carrier.

According to one exemplary embodiment, the axis of the first output shaft is parallel to that of the second output shaft. The output shafts are each located on an output axis and preferably extend from the differential in opposite directions. The output shafts have a first parallel offset to one another and with respect to a longitudinal axis of the transmission. The wheels on the respective axes in the vehicle are located on respective wheel axes, which are also offset parallel to one another. By way of example, the first output shaft is functionally connected via at least one first drive shaft to a first vehicle wheel on a first wheel axis, and the second output shaft is functionally connected via at least one second drive shaft to a second vehicle wheel on a second wheel axis. The first and second parallel offsets are preferably the same size. This means that the powertrain, in particular the transmission and drive unit, can be placed arbitrarily with respect to the longitudinal axis of the vehicle. If the powertrain, in particular the transmission, is at an angle to the longitudinal axis of the vehicle or the wheel axes, this is compensated for by the drive shafts and does not have a negative effect on the propulsion of the vehicle.

The first output shaft can also be coaxial to the second output shaft. If the output shafts are coaxial, the radial dimensions of the transmission can be reduced. By way of example, there can be gear ratio, obtained with a belt drive in particular, with which the coaxial arrangement of the output shafts can be implemented. When the output shafts are coaxial, the powertrain is preferably transverse to the longitudinal axis of the vehicle. The powertrain can also be at an angle to the longitudinal axis of the vehicle, as described above in reference to the preceding embodiments.

There is preferably a belt drive that is designed to at least indirectly functionally connect one of the gearset elements in the planetary gearset to the first output shaft. By way of example, the planet carrier in the planetary gearset can have a first gear tooth section and the first output shaft can have a second gear tooth section, or be connected thereto, and a belt in the belt drive can functionally encircle both gear tooth sections. As a result, a coaxial or axially parallel arrangement of the output shafts can be obtained using the belt drive. A higher gear ratio can also be obtained using the belt drive. This belt drive can comprise either chains or belts.

"Functionally connected" refers to a connection between two components that cannot be shifted, resulting in a permanent transfer of power, in particular a rotational rate and/or rotational torque. The connection can therefore take place directly, or via a fixed gear ratio. The connection can take place via a solid shaft, gear teeth, in particular on a spur gear, and/or with a belt.

The phrase, "at least indirectly," is understood to mean that two components are (functionally) connected to one another via at least one other component, located between the two components, or that the two components are directly connected to one another. Other components can also be placed between shafts or gear wheels, which are functionally connected to the shaft or gear wheel.

According to another implementation, a first axial bearing is located between the first spur gear and the second gearset element in the planetary gearset. The first axial bearing braces against axial forces. This eliminates a bearing element in that it combines the axial support for the intermediate shaft or first spur gear and the first output shaft. In other words, with this first axial bearing, the first spur gear cannot be displaced toward the second gearset element or first output shaft, and the second gearset element and first output shaft cannot be displaced toward the first spur gear. Both the first spur gear as well as the fist output shaft are supported by the bearing element, such that there is no need for an additional bearing element.

It is conceivable to place the first axial bearing between the first spur gear and the second gearset element according to a second aspect of the invention together with the respective bearing elements located inside the respective spur gears in accordance with the first aspect of the invention, and vice versa. It should be noted specifically, that the features of the first aspect of the invention can be combined with the features of the second aspect of the invention, and vice versa. By combining these two aspects, the transmission according to the invention can be made more compact, thus further reducing the necessary installation space.

At least one of the bearing elements is preferably designed with a double row. The advantage with this is that it allows for a very compact construction. In particular, because this prevents the formation of lateral forces on the respective spur gears, the axial structural length of the bearings for the respective spur gears can be reduced. A double-row design for the respective bearing element in an O-assembly is of particular advantage.

The stationary component also preferably comprises a bearing journal, which forms a raceway for rollers in at least one bearing element. The bearing journal is formed, for example, as a rotating part made of steel, and the outer radial surface of the bearing journal can be processed with a grinding process such that it can be used as a bearing surface for a needle roller assembly. Furthermore, the bearing seat for one of the bearing elements can be placed inside the bearing journal, in particular in a radial bearing for the first output shaft.

According to one exemplary embodiment, the second spur gear and the second output shaft form an integral element. Alternatively, the second spur gear and second output shaft are separate elements, which can be connected to one another in a material bonded, frictionally engaged, and/or form fitting manner. One such form-fitting connection is obtained by welding.

A form-fitting connection can also be obtained with gear teeth, or by bolting the two parts to one another. A frictionally engaged, or force fitting connection is obtained with an interference fit.

In a second aspect of the invention, a vehicle powertrain according to the invention comprises a transmission according to any of the preceding descriptions and a drive unit functionally connected to the transmission. The drive unit is preferably an electric machine, and the input shaft is a rotor in the electric machine, or is connected or coupled to the rotor for conjoint rotation. The transmission is therefore part of an electrical axle drive. The rotor is rotatably connected to a stator on the housing of the electric machine. The electric machine is preferably connected to a battery that supplies the electric machine with electricity. The electric machine can also preferably be controlled or regulated by a power electronics system. The drive unit can also be an internal combustion engine, in which, in this case, the input shaft is a crankshaft, or is connected to a crankshaft for conjoint rotation. In this case, the transmission is part of an internal combustion engine axle drive.

The planetary gearset described above is preferably located radially inside a rotor in the electric machine. This means that at least part of the transmission is radially inside the electric machine. This also reduces the necessary installation space.

A vehicle according to the invention in a third aspect of the invention comprises a powertrain of the type described above. The vehicle is preferably a motor vehicle, in particular an automobile (e.g. a passenger car weighing less than 3.5 tons), a bus, or a truck (busses and trucks can weigh more than 3.5 tons). In particular, the vehicle is an electric vehicle or hybrid vehicle. The vehicle comprises at least two axes, in which one of the axes is formed by a drive axle that can be powered by the powertrain. The powertrain according to the invention is functionally placed on this drive axle, and the powertrain transfers drive power to the wheels on this axis. It is also conceivable that there is a separate powertrain for each axis. The powertrain is preferably front-wheel drive, in which the input shaft and the output shafts are substantially transverse to the longitudinal axis of the vehicle. This is advantageous in compensating for an offset in the axes of the output shafts. Alternatively, the powertrain can be at an angle to the longitudinal and lateral axes of the vehicle, wherein the output shafts are connected to the respective wheels with joints that are transverse to the longitudinal axis of the vehicle.

The above definitions and explanations of technological effects, advantages and advantageous embodiments of the transmission according to the invention also apply analogously to the powertrain according to the invention and the vehicle according to the invention.

Figure 1:
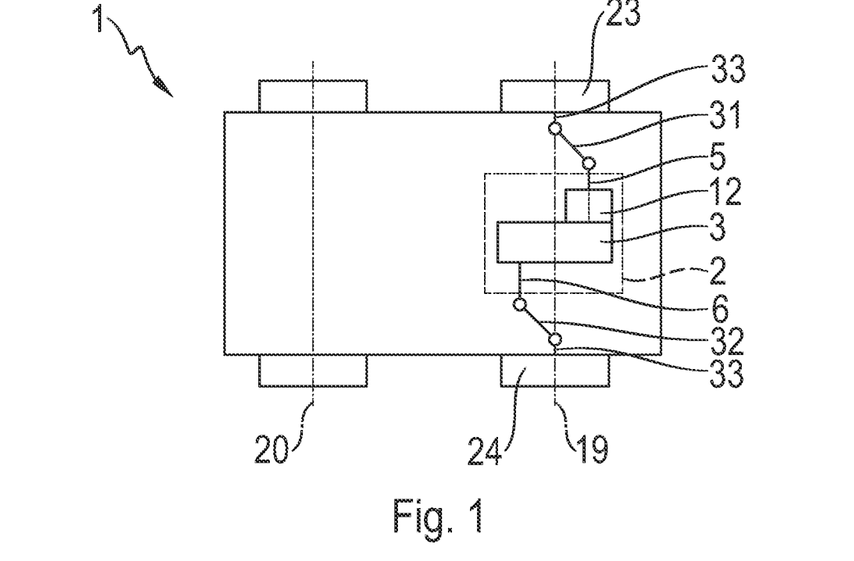
FIG. 1 shows a strongly schematic top view of a vehicle with a first embodiment of a powertrain according to the invention.

A vehicle 1 according to the invention, in the form of an electric vehicle in the present example, with two wheel axes 19, 20, is shown in FIG. 1, which has a powertrain 2 according to the invention on the first axis 19 with which the vehicle is driven. The first axis 19 can either be the front axis or rear axis of the vehicle 1. The powertrain 2 comprises a drive unit 12 in the form of an electric machine, and a transmission 3 functionally connected thereto, whereas the construction and placement of the transmission 3 in the vehicle 1 shall be explained in greater detail in reference to the other figures.

Figure 8:
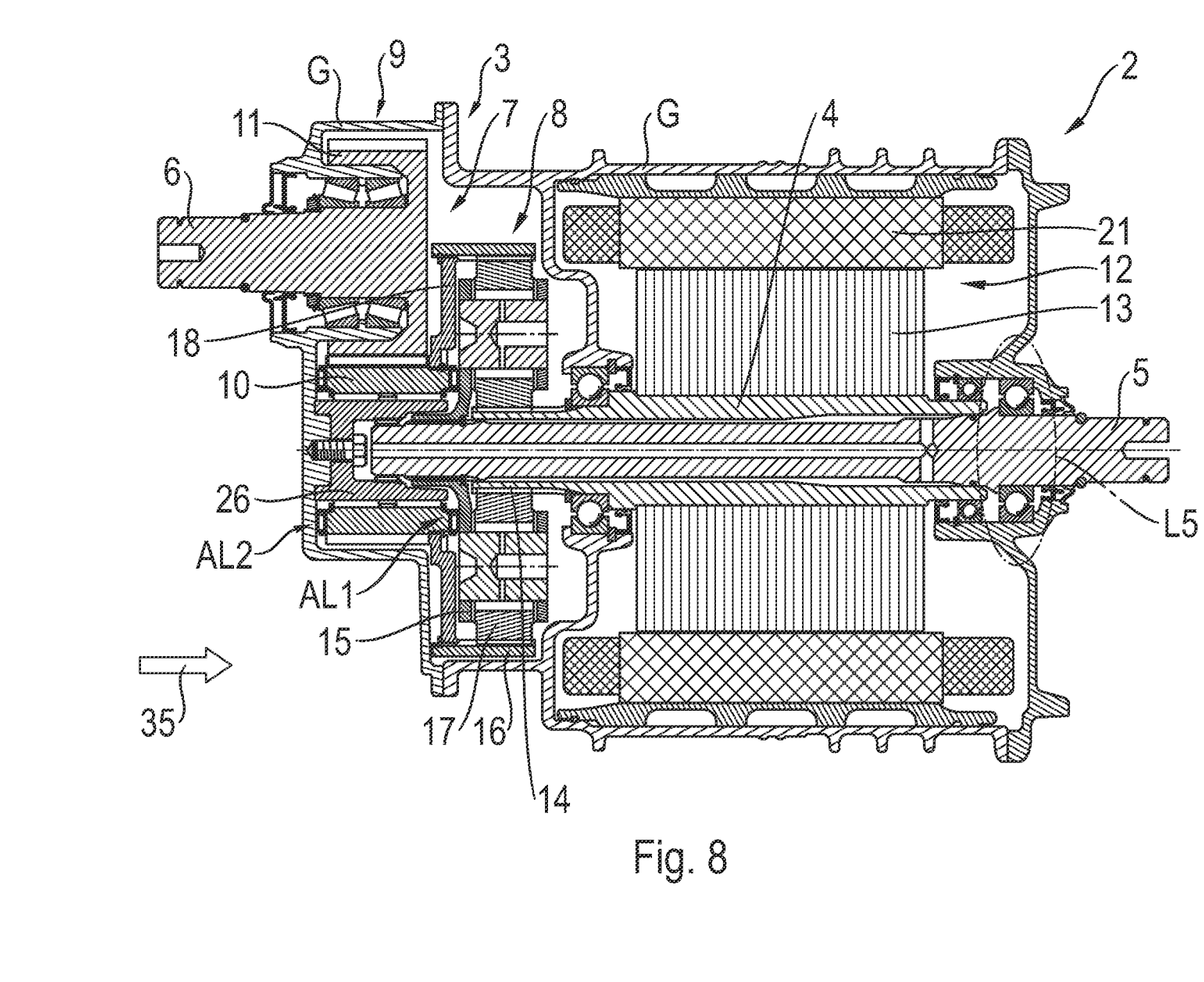
FIG. 8 shows a schematic illustration of a powertrain according to the invention in the first embodiment shown in FIGS. 1 to 5.
Figure 9:
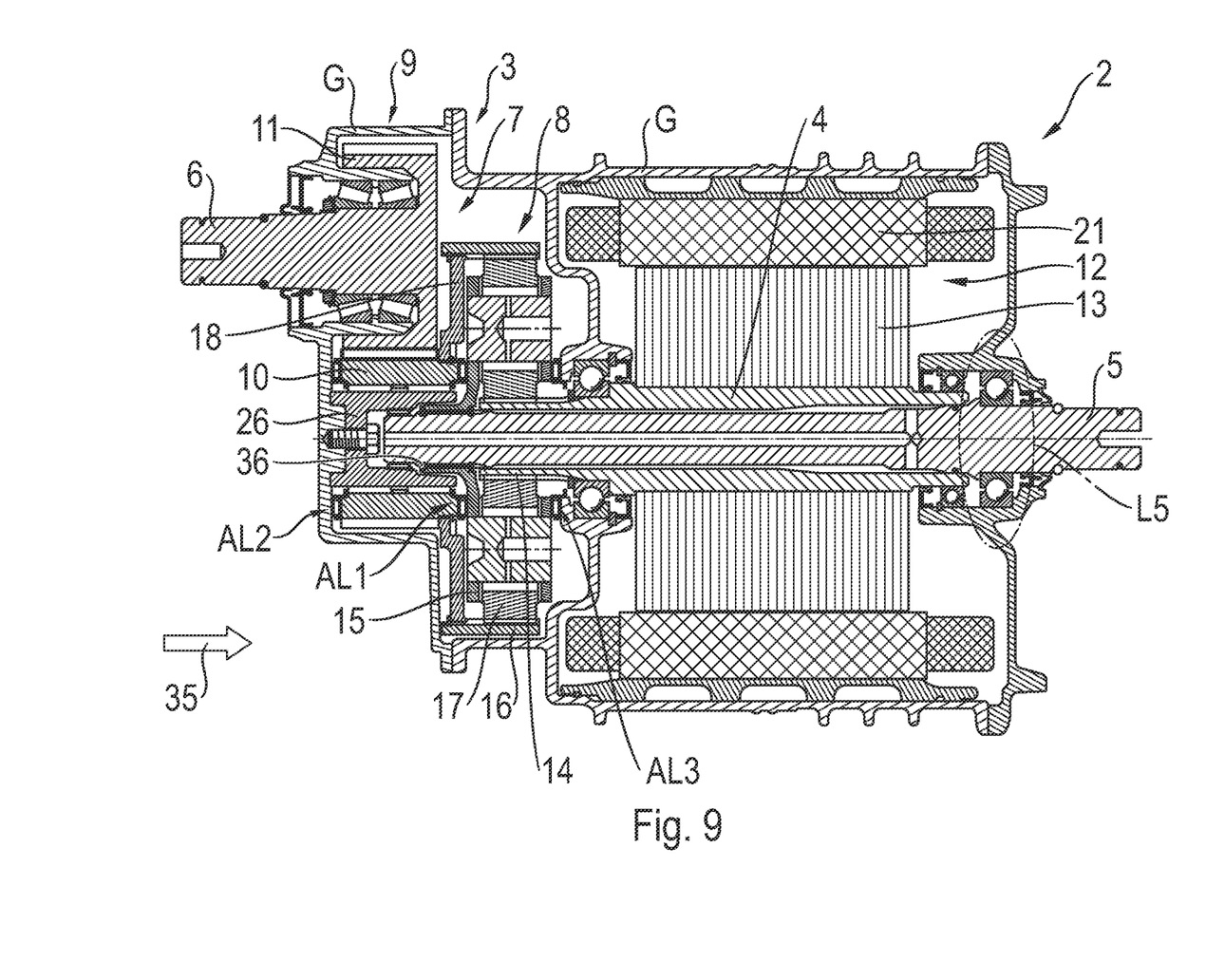
FIG. 9 shows a schematic illustration of the powertrain according to the invention in a fourth embodiment.

The electric machine is supplied with electricity by a battery, not shown, which is functionally connected to a stator 21 attached to a housing, shown in FIG. 8 and FIG. 9. The electric machine is also connected to a power electronics system, not shown here, with which it is controlled and regulated. When electricity is fed to the stator 21, a rotor 13 rotates, which is connected to an input shaft 4 in the transmission for conjoint rotation. The input shaft 4 can also be connected or coupled to a separate rotor shaft on the rotor 13 for conjoint rotation. The drive power of the drive unit 12 is conducted via the input shaft 4 into the transmission 3, and converted there by an integral differential 7, and then distributed to a first output shaft 5 and a second output shaft 6. Wheels 23, 24 with which the vehicle 1 driven are at least indirectly connected to the ends of each of the output shafts 5, 6. A dedicated drive shaft 31, 32 and hub 33 are located between the respective wheels 23, 24 and the output shafts 5, 6.

The powertrain is placed in the vehicle 1 such that the output shafts 5, 6 are transverse to the longitudinal axis of the vehicle 1.

The integral differential 7 comprises a planetary gearset 8 and spur gears 9 in all of the exemplary embodiments. The spur gearset 9 comprises two intermeshed spur gears 10, 11, the axes of which are parallel. The planetary gearset 8 has three gearwheel elements, comprising a sun gear 14, ring gear 16, and planet carrier 15, with rotating planet gears 17 on the planet carrier 15. The planetary gearset 8 has a negative gear ratio obtained by the planet gears 17 meshing with both the ring gear 16 and the sun gear 14. The constructions as well as the connections of the planetary gearset 8 and spur gearset 9 shall be explained below in greater detail. The integral differential 7 thus contains both a planetary gearing and a spur gearing functionally connected thereto.

Figure 2:
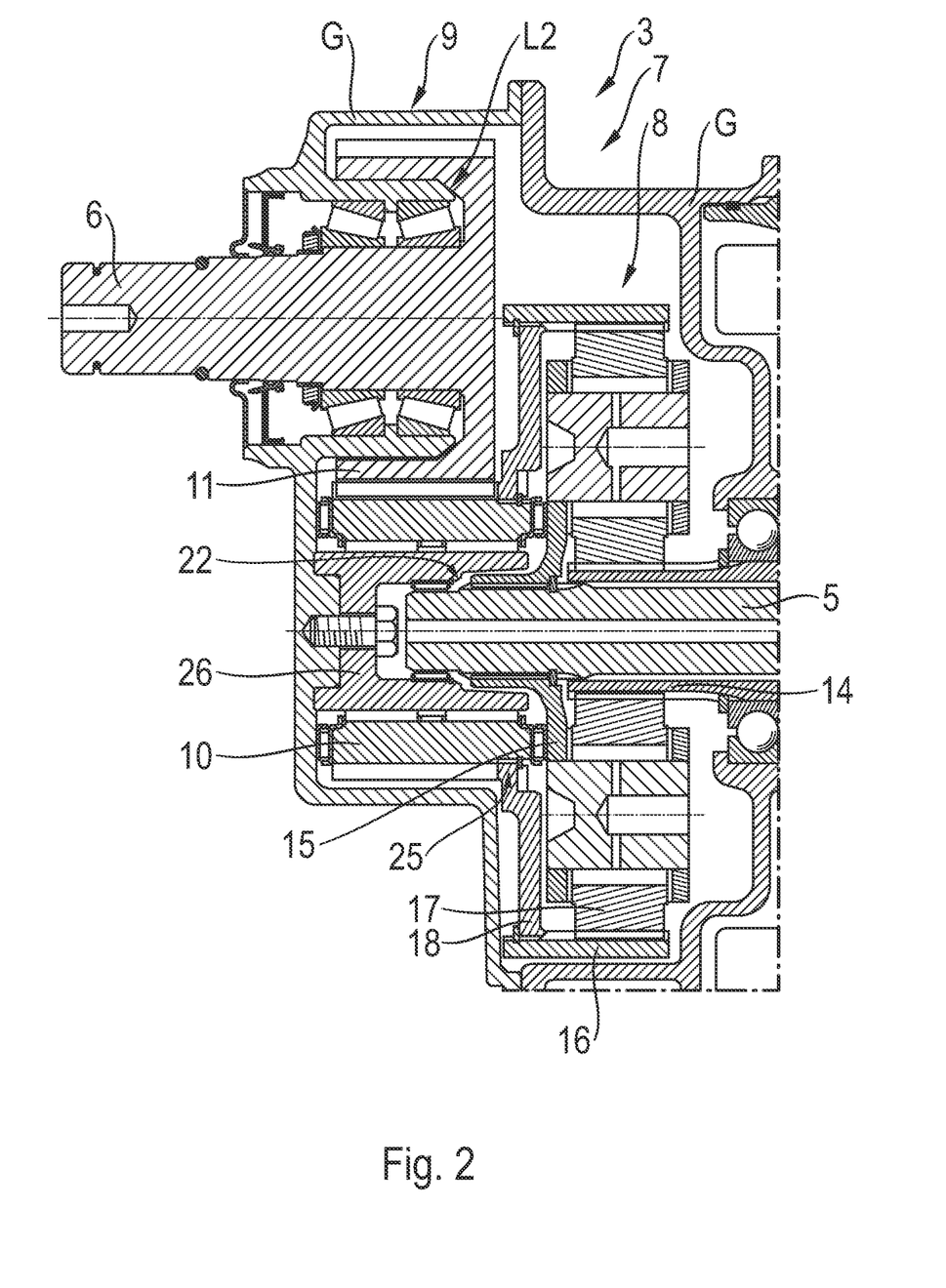
FIG. 2 shows a schematic illustration of a transmission according to the invention for the powertrain according to the invention shown in FIG. 1.

A first gearset element in the planetary gearset 8, the sun gear 14 in this case, is connected to the input shaft 4 for conjoint rotation. This connection is obtained by means of a first set of gear teeth 22 (cf. FIG. 2 and FIG. 3). A second gearset element, the planet carrier 15 in this case, is connected to the first output shaft 5 for conjoint rotation, and transfers the drive power applied to it, in particular a rotational rate and output torque, at least indirectly to the first wheel 23 on the first axis 19. A third gearset element, the ring gear 16 in this case, is connected via an annular intermediate shaft 18 to the first spur gear 10 in the spur gearset 9 for conjoint rotation. This connection between the ring gear 16 and the intermediate shaft 18 is obtained with a second set of gear teeth 25 (cf. FIG. 2 and FIG. 3). This can also be formed by a material bond and/or form-fitting connection, in particular formed by a welded and/or bolted connection.

The drive power applied to the first spur gear 10 is transferred to the second spur gear 11 and conducted from there, at least indirectly, to the second wheel 24 on the first axis 19, via the second output shaft 6 integrally connected thereto. The planet carrier 15 thus forms the first output drive element in the transmission 3, and the second output drive element in the transmission 3 is formed by the second spur gear 11 in the spur gearset 9. Alternatively, the second spur gear 11 and second output shaft 6 can be connected to one another in a materially bonded, frictionally engaged, and/or form-fitting manner.

A gear ratio can be obtained in the spur gearset 9 that is a function of the diameter and number of teeth on the spur gears 10, 11. A first output torque can be transferred to the first output shaft 5 by means of the planetary gearset 8. A bracing torque counter to the first output torque is transferred to the spur gearset 9 and can be converter in the spur gearset 9 such that second output torque, corresponding to the first output torque, can be transferred to the second output shaft 6. The transmission 3 thus functions as a differential gearing, and consequently forms the integral differential 7.

The planetary gearset 8 and the spur gearset 9 are axially adjacent to one another, and the planetary gearset 8 is located axially between the spur gearset 9 and the drive unit 12, cf. FIG. 8 or FIG. 9. It is also conceivable for the planetary gearset 8 and spur gearset 9 to be placed above one another in the radial direction, or for the spur gearset 9 to be placed axially between the planetary gearset 8 and the drive unit 12. The first output shaft 5 is coaxial to the intermediate shaft 18 and the input shaft 4, and the axis of the second output shaft 6 is parallel thereto. This can also be seen in FIG. 1. The input shaft 4 forms a hollow shaft, and the first output shaft 5 passes axially through the input shaft 4 and therefore through the transmission 3 and the drive unit 12. The first output shaft 5 extends to the right in the present case, and the axis of the second output shaft 6 extends toward the left, in the opposite direction, parallel thereto.

This assembly, in accordance with the first exemplary embodiment shown in FIGS. 2 to 5, as well as FIG. 8, allows for a compact embodiment comprising both a transmission and a differential. Because there is no need to generate an axle torque, which would be twice as strong as a respective wheel torque, the transmission 3 can have a more slender design.

Figure 3:
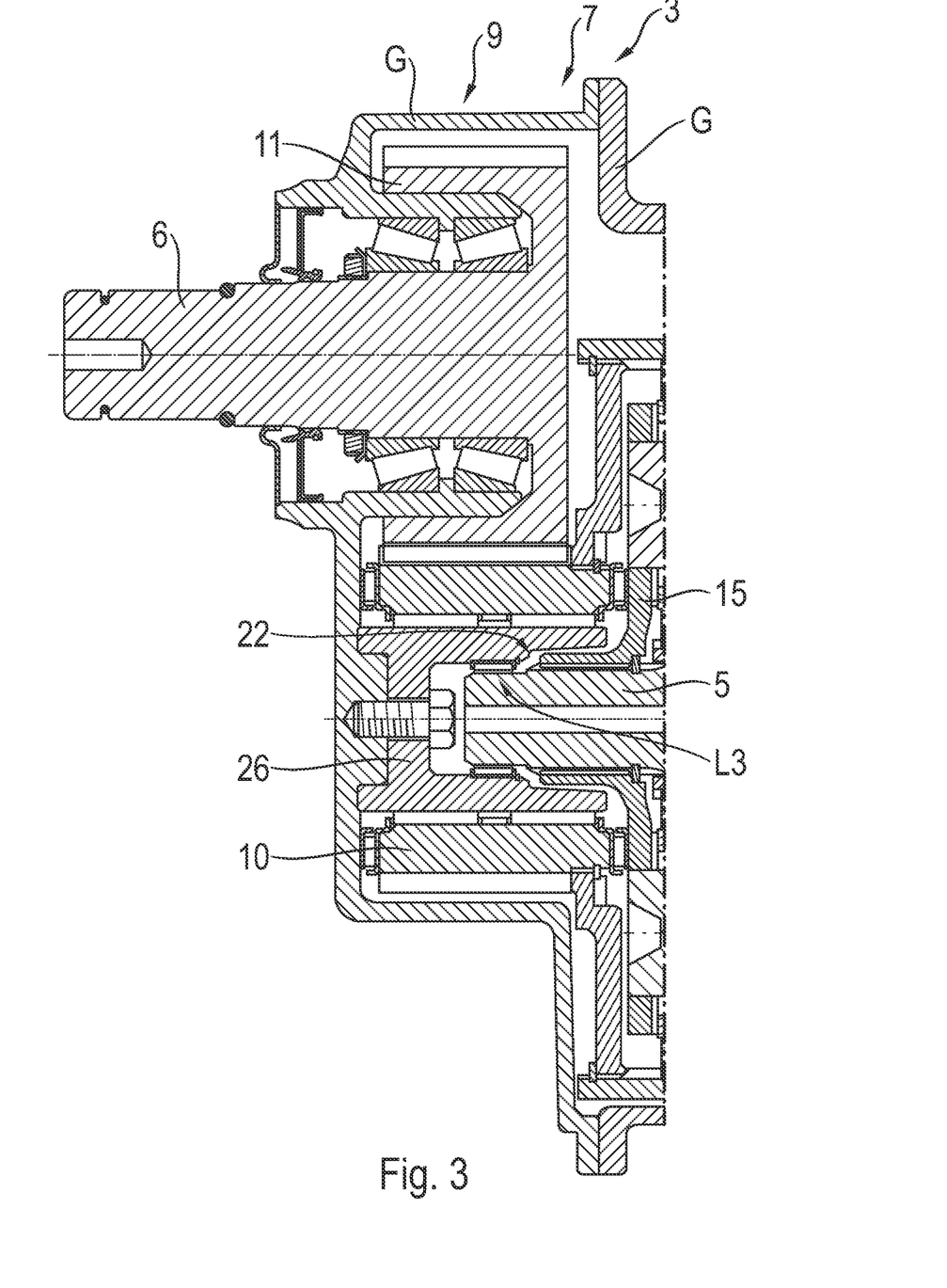
FIG. 3 shows a detailed illustration of a spur gear stage in the transmission according to the invention, illustrating how the spur gears are supported therein.

The spur gearset 9 for the integral differential 7 is shown in greater detail on the basis of different examples in FIG. 3 together with FIGS. 4 to 7. The first spur gear 10 is supported on a stationary component G by means of a first bearing element L1, which is partially inside the first spur gear 10, via a bearing journal 26. The stationary component in this case is the housing G for the transmission 3. The housing G can therefore be regarded as synonymous with the stationary component in the transmission 3. The bearing journal 26 is bolted to the housing G in this case, and is therefore part of the housing G.

Figure 4:
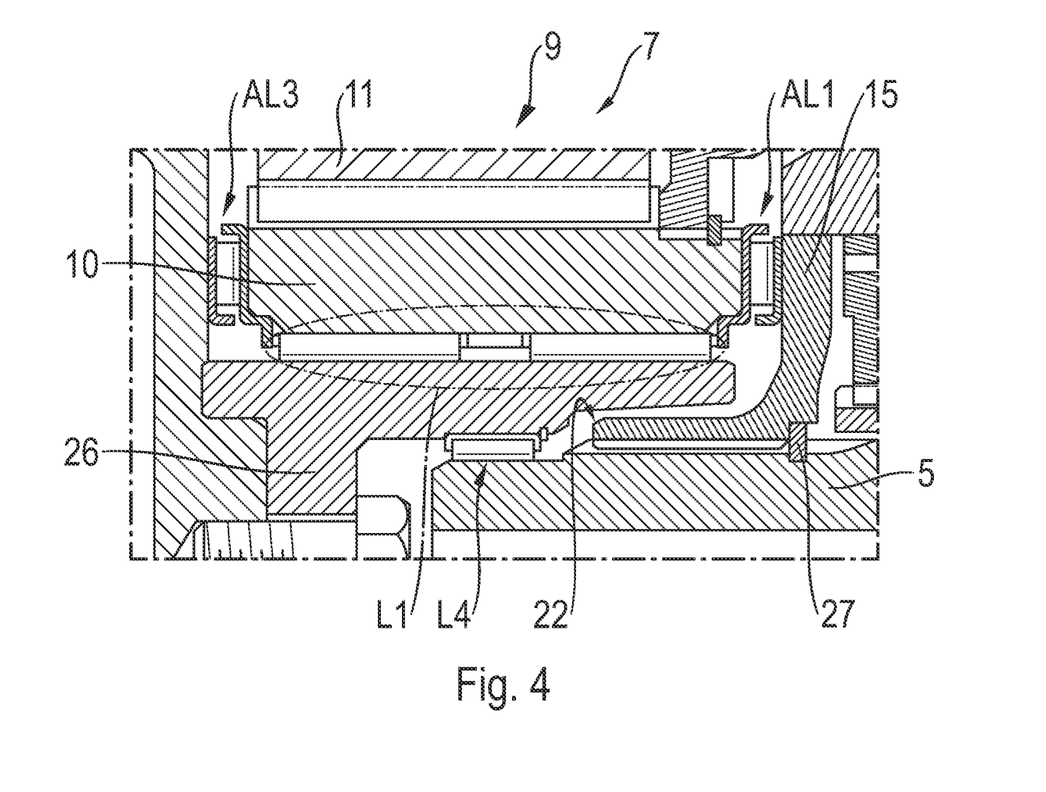
FIG. 4 shows a detailed illustration of how a first spur gear is supported in the spur gear stage shown in FIG. 2 and FIG. 3.

The first bearing element L1 is a radial bearing in FIG. 4, with two adjacent needle roller assemblies located inside the first spur gear 10. The needle roller assemblies can also form separate bearing elements. Instead of needle roller assemblies, the first bearing element L1 can also have cylindrical rollers.

The bearing journal 26 is a rotating part made of steel, in which the outer surface of the bearing journal 26 has been processed such that it functions as the raceway for the needle roller assembly on the first bearing element L1. There is also a bearing seat on the inside of the bearing journal 26 for a fourth bearing element L4 in FIG. 4, with which the first output shaft 5 is supported and guided radially. The fourth bearing element L4 is not necessary if the first output shaft 5 is centered by the first set of gear teeth 22 on the planet carrier 15. This allows for loads to be compensated for on the planet gears 17 in the planetary gearset 8. A sliding bearing with a certain amount of play can be provided for this, wherein the sliding bearing prevents the first output shaft 5 from becoming distorted when not subjected to a load. When loaded, the first output shaft 5 is centered in the planet carrier, as stated above, via the first set of gear teeth 22, while the sliding bearing lifts it, thus reducing frictional losses.

"Inside" means that the components of the respective bearing elements, i.e. the at least one inner ring, at least one outer ring, and the rollers, are substantially radially inside the gear body of the respective spur gear.

The axial support for the first spur gear 10 is obtained, as shown in FIG. 4, via a first axial bearing AL1 and second axial bearing AL2. The first axial bearing AL1 is located axially between the first spur gear 10 in the spur gearset 9 and the planet carrier 15 in the planetary gearset 8, which is connected to the first output shaft 5 for conjoint rotation. The first axial bearing AL1 braces against the axial forces to the planet carrier 15 in the planetary gearset 8. This is then braced against the first output shaft 5 by means of a first retaining ring 27. The second axial bearing AL2 is on the other side of the first spur gear 10, located axially between the end surface of the first spur gear 10 and the housing G. The first and second axial bearings AL1, AL2 also directly abut the first spur gear 10.

Figure 5:
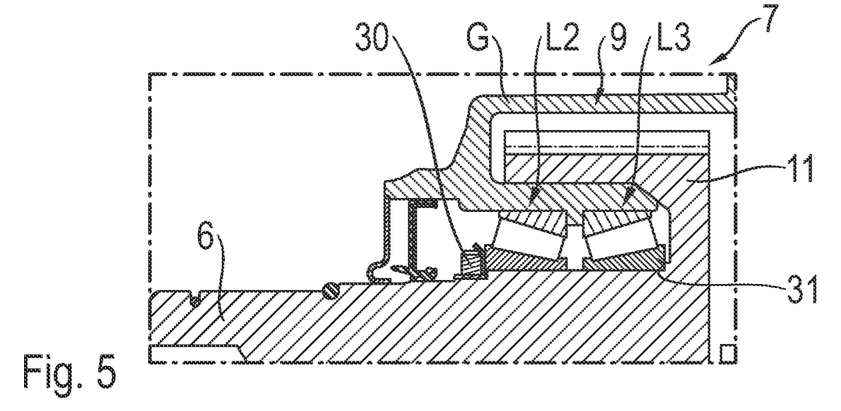
FIG. 5 shows a detailed illustration of how a second spur gear is supported in the spur gear stage shown in FIG. 2 and FIG. 4.

The second spur gear 11 is supported on the stationary component G by a second bearing element L2 and third bearing element L3, as can be seen better in FIG. 3 and FIG. 5, and the two bearing elements L2, L3 are located inside the second spur gear 11. The two bearing elements L2, L3 form upright tapered roller bearings in and O-assembly, thus forming double rows. Each of the two bearing elements L2, L3 in FIG. 5 have an inner ring 28a, 28b and an outer ring 29a, 29b, wherein the inner rings 28a, 28b bear on the second output shaft 6 connected to the spur gearset 9, and the outer rings 29a, 29b are non-rotatably seated in the housing G. The first inner ring 28a on the second bearing element L2, on the left in the drawing, is braced axially against a shaft nut 30, while the second inner ring 28b on the third bearing element L3, on the right side here, is braced against the second output shaft 6 via a ledge 31 on the shaft. The outer rings 29a, 29b on the two bearing elements L2, L3 are braced axially against a shoulder 32 on the housing G. Axial installation space is reduced as a result of the bearing elements L1, L2, L3 located in the gearwheel bodies of the spur gears 10, 11. The second and third bearing elements L2, L3 can also be ball bearings, depending on the strength and direction of the forces acting on them.

Figure 6:
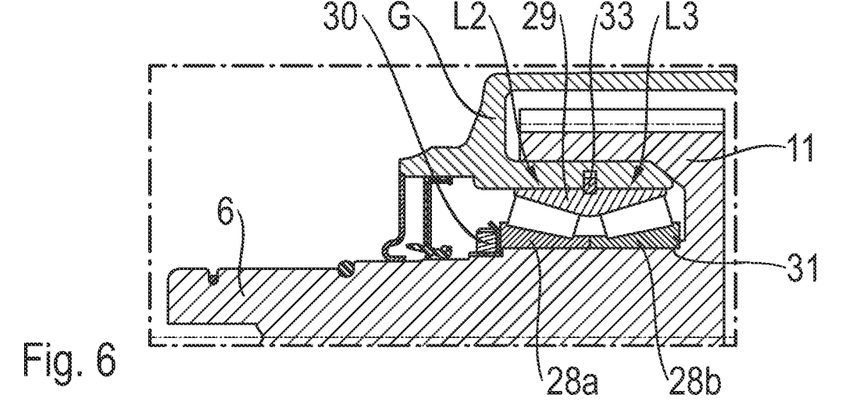
FIG. 6 shows a detailed illustration of how the second spur gear is supported in the spear gear stage in a second embodiment.

FIG. 6 shows a second variation of the support for the second spur gear 11. Unlike in FIG. 5, the second and third bearing elements L2, L3 in these variations share an outer ring 29. This is held in place axially by a second retaining ring 33. The two bearing elements L2, L3 in the form of tapered roller bearings also have two separate inner rings 28a, 28b, which are axially upright, like those in FIG. 5. The advantage with this is the compact construction and the simple adjustment of the appropriate tension, because it is possible to use preadjusted bearing elements L2, L3.

Figure 7:
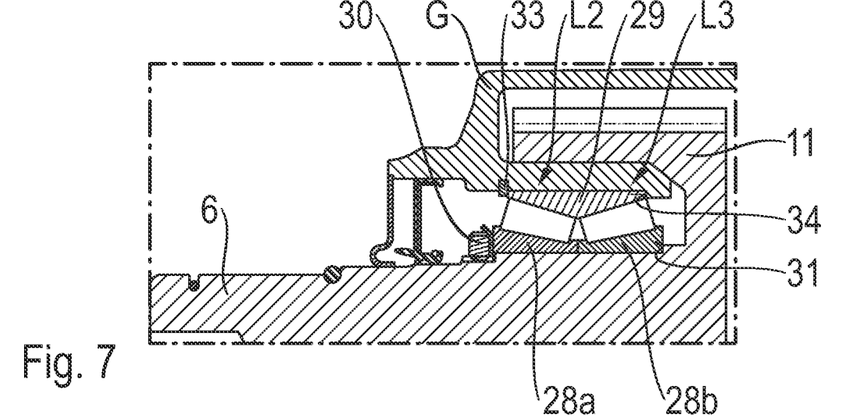
FIG. 7 shows a detailed illustration of how the second spur gear is supported in the spur gear stage in a third embodiment.

As in FIG. 6, the two bearing elements L2, L3 in FIG. 7 share an outer ring 29. In this case, however, the outer ring 29 is axially secured in this illustration on the right by a housing shoulder 34, and on the left by a second retaining ring 33. The inner rings 28a, 28b are axially upright here as well, as is shown in FIG. 5. Preadjusted bearing elements L2, L3 can also be used in this variation. The advantage with this variation lies in the simple assembly and disassembly.

FIG. 8, which shows the powertrain 2 according to the first embodiment, also shows a first variation for installing the bearing elements for supporting the first output shaft 5 in the housing G in the axial direction. The fundamental structure of the powertrain 2 shown here has already been described above.

Axial forces exist in the meshings in both the planetary gearset 8 and the spur gearset 9 in the integral differential 7, which are braced against in the housing G. The input shaft 4 for the transmission 3 is supported statically using a fixed-loose bearing. The second output shaft 6 in the spur gearset 9 is also statically supported by means of the O-assembly shown by way of example and in FIGS. 5 to 7 and described in reference thereto. The input shaft 4 is also rotatably supported in the housing G by the bearing elements not described in detail, or indicated with reference symbols here.

The axial support for the first output shaft 5 and the first spur gear 10 in the spur gearset 9 are coupled, as explained above. Axial forces are braced against toward the left along the X-axis in the housing G with the second axial bearing AL2 between the housing G and the left-hand end surface of the first spur gear 10. The X-axis is defined here by the arrow 35. The first axial bearing AL1 is located between the first spur gear 10 and the planetary gearing connection to the first output shaft 5, in this case the planet carrier 15, or the second gearset element in the planetary gearset 8, which transfers axial forces between the planet carrier 15 and the first spur gear 10. The first output shaft 5 is also braced against the housing G via a fifth bearing element L5 in the form of a ball bearing. This fifth bearing element L5 only absorbs axial forces to the right along the X-axis.

An alternative design of the powertrain 2 is shown in FIG. 9, showing a second variation for the installation of the bearing elements for bracing the first output shaft 5 against the housing G in the axial direction. Unlike in FIG. 8, there is a third axial bearing AL3 between the planet carrier 15 and the housing G, which braces against axial forces toward the right along the X-axis in the housing G. This fifth bearing element L5 used as an axial bearing in FIG. 8 can therefore be used as just a radial bearing in this case. The prerequisite for this is that the first output shaft 5 is axially secured. This is obtained with a third retaining ring 36 with respect to the planet carrier 15. An alternative would be a retaining ring that works on both sides, analogous to the second retaining ring 33 in FIG. 6, between the planet carrier 15 and the first output shaft 5.

The respective axial bearings AL1, AL2, Al3 can be formed by needle roller bearings, cylindrical roller bearings, and/or ball bearings.

REFERENCE SYMBOLS 1 vehicle
2 powertrain
3 transmission
4 input shaft
5 first output shaft
6 second output shaft
7 integral differential
8 planetary gearset
9 spur gearset
10 first spur gear
11 second spur gear
12 drive unit or electric machine
13 rotor
14 sun gear
15 planet carrier
16 ring gear
17 planet gear
18 intermediate shaft
19 first axis
20 second axis
21 stator
22 second set of gear teeth
23 first wheel
24 second wheel
25 first set of gear teeth
26 bearing journal
27 first retaining ring
28a first inner ring
28b second inner ring
29 outer ring
29a first outer ring
29b second outer ring
30 shaft nut
31 shaft ledge
32 shoulder
33 second retaining ring
34 housing shoulder
35 arrow
36 third retaining ring
AL1 first axial bearing
AL2 second axial bearing
AL3 third axial bearing
G stationary component or housing
L1 first bearing element
L2 second bearing element
L3 third bearing element
L4 fourth bearing element
L5 fifth bearing element

We claim:

1. A transmission for a powertrain in a vehicle, the transmission comprising:
an input shaft;
a first output shaft;
a second output shaft; and
an integral differential mechanically located between the input shaft and the two output shafts, the integral differential comprising a planetary gearset with a plurality of gearset elements and a spur gearset,
wherein the spur gearset includes a first spur gear and second spur gear that mesh together,
wherein a first gearset element of the plurality of gearset elements is connected to the input shaft for conjoint rotation,
wherein a second gearset element of the plurality of gearset elements is connected to the first output shaft for conjoint rotation,
wherein a third gearset element is at least indirectly connected to the second output shaft for conjoint rotation,
wherein a first output torque is transferrable to the first output shaft via the planetary gearset,
wherein a bracing torque of the planetary gearset is converted by the spur gearset such that a second output torque corresponding to the first output torque is transferrable to the second output shaft,
wherein the first spur gear is at least indirectly supported by a first bearing element on a stationary component,
wherein the second spur gear is at least indirectly supported on the stationary component by at least one second bearing element,
wherein at least one of the bearing elements is at least partially inside the respective spur gear, and
wherein the planetary gearset and the spur gearset are placed radially above one another, such that the planetary gearset and the spur gearset are located in a common plane.

2. The transmission according to claim 1, wherein at least one of the bearing elements includes a double-row design.

3. The transmission according to claim 1, wherein the stationary component comprises a bearing journal, which serves as a guide for roller bodies in at least one bearing element.

4. The transmission according to claim 1, wherein the planetary gearset and the spur gearset are axially adjacent to one another.

5. The transmission according to claim 1, wherein the input shaft is either solid or hollow.

6. The transmission according to claim 1, wherein the second spur gear and second output shaft form an integral unit.

7. The transmission according to claim 1, wherein the second spur gear and second output shaft are connected to one another in a material bonded, frictionally engaged, and/or form-fitting manner.

8. The transmission according to claim 1, wherein the first spur gear is connected to the third gearset element in the planetary gearset for conjoint rotation via an intermediate shaft.

9. The transmission according to claim 1, wherein an axis of the first output shaft is parallel to that of the second output shaft.

10. A powertrain for a vehicle, comprising a transmission according claim 1, and a drive unit functionally connected to the transmission, in particular an electric machine.

11. A vehicle, comprising a powertrain according to claim 10.

12. The transmission according to claim 1, wherein the first gearset element in the planetary gearset is a sun gear, the second gearset element is a planet carrier, and the third gearset element is a ring gear.

13. A transmission for a powertrain in a vehicle, the transmission comprising:
an input shaft;
a first output shaft;
a second output shaft;

an integral differential mechanically located between the input shaft and the two output shafts; and a planetary gearset with a plurality of gearset elements and a spur gearset, wherein the spur gearset has a first spur gear and second spur gear that mesh together, wherein a first gearset element of the plurality of gearset elements is connected to the input shaft for conjoint rotation, wherein a second gearset element of the plurality of gearset elements is connected to the first output shaft for conjoint rotation, wherein a third gearset element of the plurality of gearset elements is connected at least indirectly to the first spur gear in the spur gearset for conjoint rotation, wherein the second spur gear is at least indirectly connected to the second output shaft for conjoint rotation, wherein a first output torque is transferrable to the first output shaft via the planetary gearset, wherein a bracing torque of the planetary gearset is converted in the spur gearset such that a second output torque, corresponding to the first output torque, is transferrable to the second output shaft, wherein a first axial bearing is located axially between the first spur gear and the second gearset element in the planetary gearset, and wherein the planetary gearset and spur gearset are placed radially above one another.

14. The transmission according to claim 13, wherein the planetary gearset and the spur gearset are axially adjacent to one another.

15. The transmission according to claim 13, wherein the first gearset element in the planetary gearset is a sun gear, the second gearset element is a planet carrier, and the third gearset element is a ring gear.

16. The transmission according to claim 13, wherein the second spur gear and second output shaft form an integral unit.

17. The transmission according to claim 13, wherein the second spur gear and second output shaft are connected to one another in a material bonded, frictionally engaged, and/or form-fitting manner.

18. A transmission for a powertrain in a vehicle, the transmission comprising:

an input shaft;

a first output shaft;

a second output shaft; and an integral differential mechanically located between the input shaft and the two output shafts, the integral differential comprising a planetary gearset with a plurality of gearset elements and a spur gearset, wherein the spur gearset includes a first spur gear and second spur gear that mesh together, wherein a first gearset element of the plurality of gearset elements is connected to the input shaft for conjoint rotation, wherein a second gearset element of the plurality of gearset elements is connected to the first output shaft for conjoint rotation, wherein a third gearset element is at least indirectly connected to the second output shaft for conjoint rotation, wherein a first output torque is transferrable to the first output shaft via the planetary gearset, wherein a bracing torque of the planetary gearset is converted by the spur gearset such that a second output torque corresponding to the first output torque is transferrable to the second output shaft, wherein the first spur gear is at least indirectly supported by a first bearing element on a stationary component, wherein the second spur gear is at least indirectly supported on the stationary component by at least one second bearing element, wherein at least one of the bearing elements is at least partially inside the respective spur gear, and wherein at least one of the bearing elements includes a double-row design.

19. The transmission according to claim 18, wherein the stationary component comprises a bearing journal, which serves as a guide for roller bodies in at least one bearing element.

20. The transmission according to claim 18, wherein an axis of the first output shaft is parallel to that of the second output shaft.

* * * * *